UNITED STATES PATENT OFFICE.

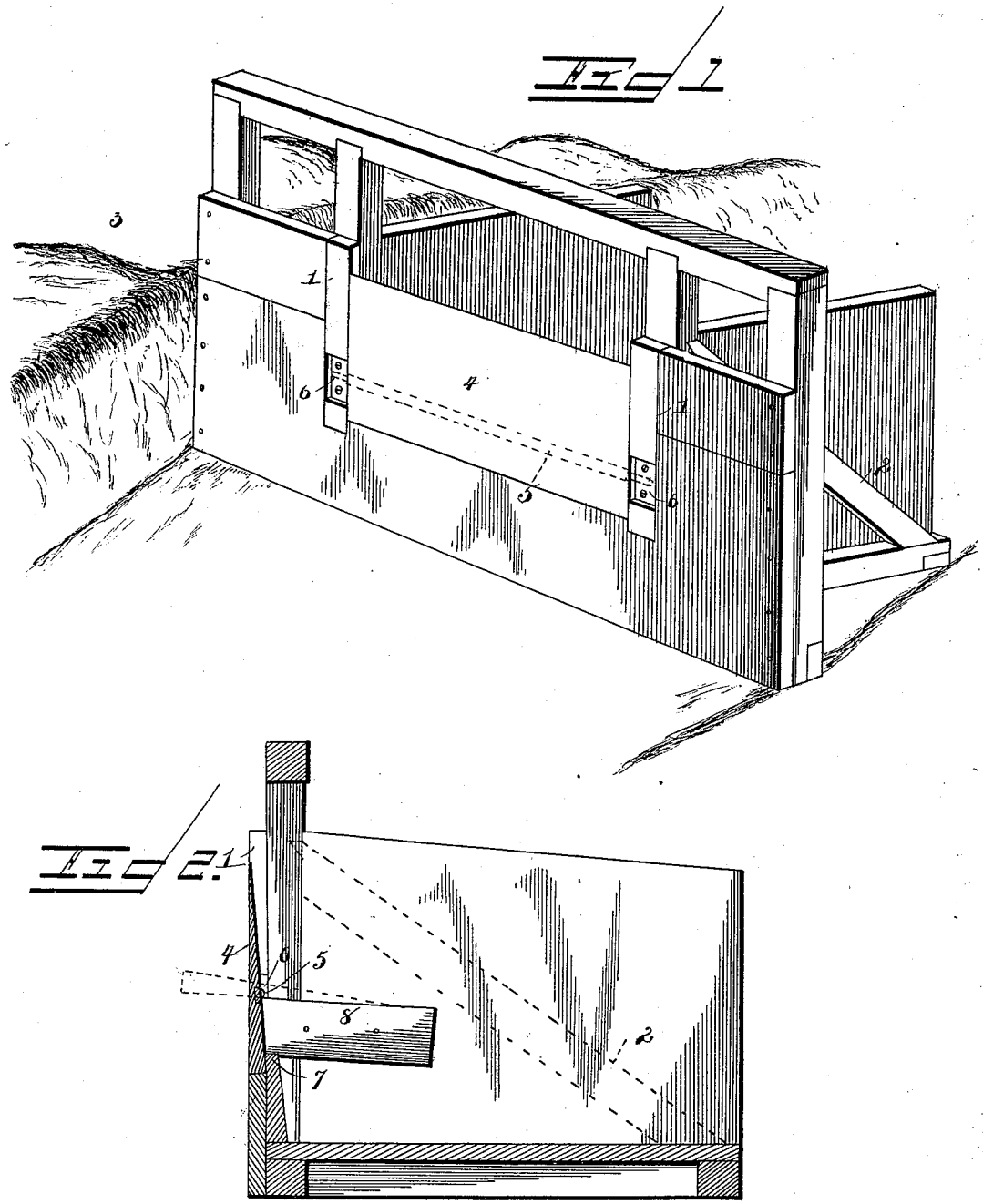

ASA DEAN, OF WILLIS, TEXAS.

FLOOD-GATE.

SPECIFICATION forming part of Letters Patent No. 511,516, dated December 26, 1893.

Application filed August 1, 1893. Serial No. 482,126. (No model.)

*To all whom it may concern:*

Be it known that I, ASA DEAN, a citizen of the United States, residing at Willis, in the county of Montgomery and State of Texas, have invented a new and useful Flood-Gate, of which the following is a specification.

My invention relates to improvements in flood gates, and has for its object to provide a simple and effective gate suitable for use in connection with mill-dams, races, and levees of all kinds where it is desirable to maintain the confined water at a certain height, permanently, and yet allow it to escape when it rises to a greater height.

It is a further object of my invention to provide a gate for the purpose named which will automatically yield when the water reaches a height greater than is desired, and will return to its operative or restraining position when the level again falls to the predetermined height.

Further objects and advantages of my invention will appear in the following description, and the novel features thereof will be particularly pointed out in the appended claim.

In the drawings: Figure 1 is a perspective view of a flood gate embodying my invention, arranged in the operative position. Fig. 2 is a vertical sectional view of the same.

Similar numerals of reference indicate corresponding parts in both the figures of the drawings.

1, 1, designate the uprights which are arranged at opposite sides of the opening in which the gate is designed to be placed, 2 the braces which are employed in connection with said uprights, and 3 a portion of a dam or levee.

The gate, 4, is provided at opposite sides, about one third of the height of the entire gate from its lower edge, with trunnions or spindles, 5, which are mounted in suitable bearings, 6, in the uprights. The gate is tapered or wedge-shaped in vertical section, as shown clearly in Fig. 2, being reduced gradually in thickness from its lower to its upper edge. The lower edge of the gate is designed to swing toward the source of the water, or upwardly, a stop, 7, being provided to check the movement thereof when it reaches its vertical or operative position, and a stop, 8, being provided, in about the plane of the trunnions or spindle, to check its motion when opened.

The water may rise in front of the gate until its surface reaches the level of the trunnions or spindle, up to which point its weight will hold the gate firmly closed; also, the water may rise above the pivotal point of the gate until the weight above the said point is greater than the weight or pressure which is applied to the lower portion, when the gate will be reversed or turned to a horizontal position, as shown in dotted lines in Fig. 2. In this position the water passes both above and below the gate, and escapes until its level falls below the plane of the pivotal point, when the preponderance of the lower wing of the gate will cause the same to descend slightly until caught by the water and forced positively to its closed position.

It will be seen that the operation of the gate is automatic, both opening and closing by the pressure of the water, and thus controlling the height thereof without the attention of a watchman or operative.

The lower wing or leaf of the gate, or the portion thereof below the pivotal point, is virtually weighted, in that it is by its increased thickness heavier than the upper wing or leaf, while at the same time the width of the latter is about double that of the former, as will be noted by reference to the drawings.

Various changes in the form, proportion and minor details of construction may be resorted to without departing from the spirit or sacrificing any of the advantages of my invention.

Having thus described my invention, I claim—

In a flood gate, the combination with a suitable supporting framework, of a horizontally-pivoted gate 4 having a transverse pivot 5, which is arranged at an intermediate point of the height of the gate to form upper and lower wings, the upper wing being about double the width of the lower wing and the gate being increased in thickness from its upper to its lower edge, whereby the preponderance of weight is in the lower wing, a horizontal stop 8, arranged substantially in the plane of the pivot 5, and a stop 7 to engage the lower wing when the gate is in an upright position, substantially as specified.

In testimony that I claim the foregoing as my own I have hereto affixed my signature in the presence of two witnesses.

ASA DEAN.

Witnesses:
S. A. McCALL,
O. M. WALKER.